Patented Aug. 10, 1943

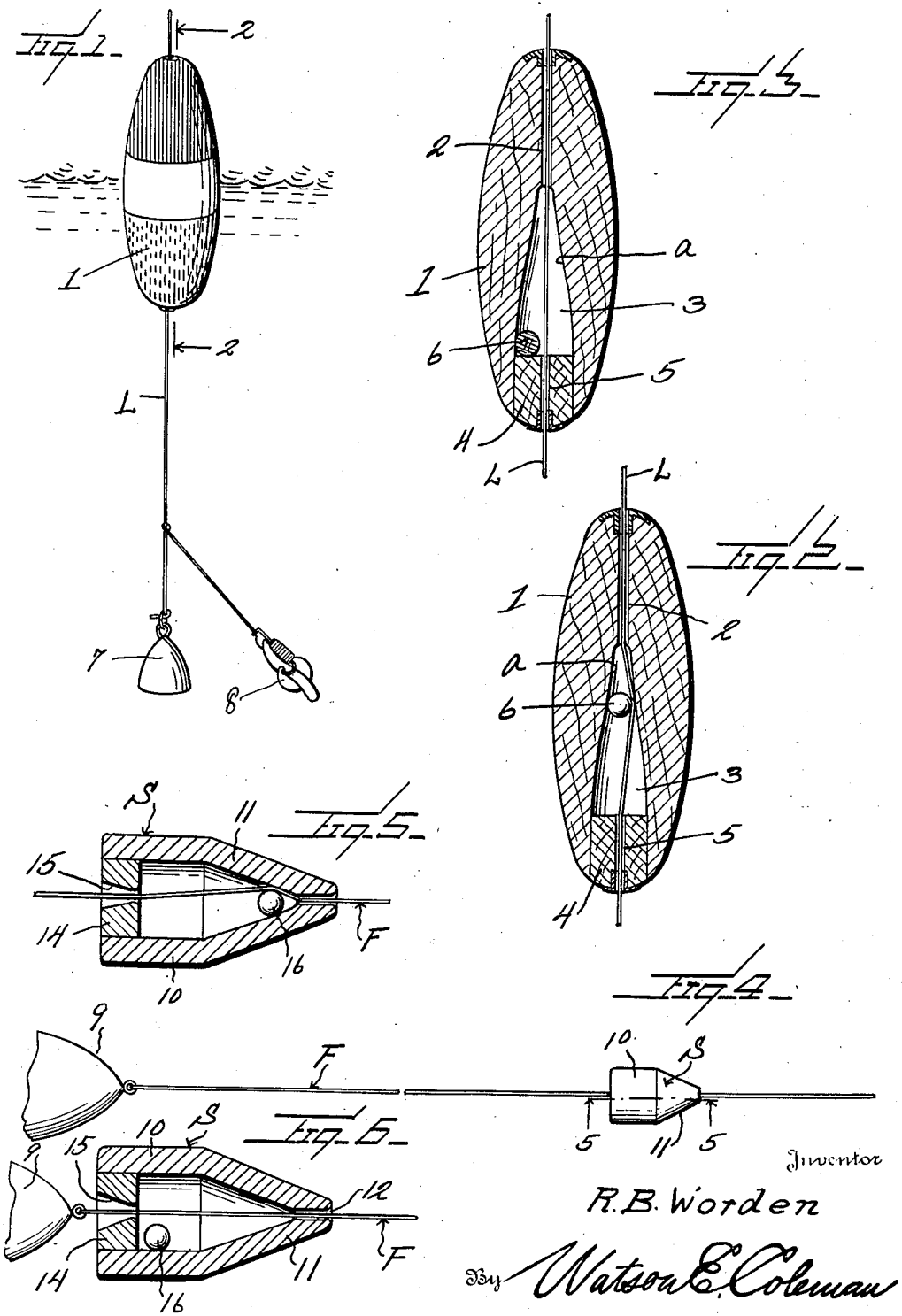

2,326,510

UNITED STATES PATENT OFFICE 2,326,510

FISHING LINE ATTACHMENT

R. B. Worden, Granger, Wash.

Application October 2, 1941, Serial No. 413,370

3 Claims. (Cl. 43—49)

This invention relates to line attachments such as fishing floats, bobbers and sinkers, and it is an object of the invention to provide a device of this kind so constructed that it is self-adjusting when in use in order to permit any desired amount of line to be let down or to allow release of the attachment.

It is also an object of the invention to provide a device of this kind including a means for locking the float or bobber to the line and which means is effective only when the float or bobber is in the water or which is released when a striking fish hits a lure.

The invention consists in the details of construction and in the combination and arrangement of the several parts of my improved attachment whereby certain important advantages are attained, as will be hereinafter more fully set forth.

In order that my invention may be the better understood, I will now proceed to describe the same with reference to the accompanying drawing, wherein:

Figure 1 is a view in perspective of a float or bobber constructed in accordance with an embodiment of my invention and applied to a line.

Figure 2 is a longitudinal sectional view taken through the device on line 2—2 of Figure 1 with the line in elevation.

Figure 3 is a view partly in section and partly in elevation of the device as illustrated in Figure 2 with the bead in release position with respect to the line.

Figure 4 is an elevational view illustrating another embodiment of my invention.

Figure 5 is an enlarged detailed sectional view taken substantially on the line 5—5 of Figure 4, and Figure 6 is a view somewhat similar to Figure 4 but showing the attachment or sinker in a second position upon the line.

In the embodiment of the invention as illustrated in Figures 1, 2 and 3, 1 denotes a float or bobber which may be made of wood or plastics or such other material as may be preferred and which has disposed axially therethrough an opening 2. This opening 2 has its lower portion $a$ outwardly flared toward the lower or bottom end of the float whereby an elongated chamber 3 is provided, the inner portion of which being restricted.

Snugly fitted in the outer or lower extremity of this chamber 3 is a plug or stopper 4 and disposed axially through this plug or stopper 4 is an opening 5 which is in alinement with a portion of the opening 2 at the top or upper end of the float or bobber 1.

Within the chamber 3 is the freely movable bead 6 of wood or other buoyant material. This bead 6 is preferably spherical.

The fishing line L is freely inserted through the opening 2 of the float or bobber 1 and through the opening 5 is the plug or stopper 4 whereby the float or bobber 1 has unhindered movement lengthwise of the line L. The float or bobber 1 is also, of course, above the usual weight 7 and a snell 8. In the accompanying drawing, only one snell is shown but it is to be understood that as many as desired may be employed, it being only required that the float or bobber 1 be thereabove on the line L.

In practice, as the weight 7 with the baited snell or snells 8 are descending, the bead 6 will be within the lower or larger portion of the chamber 3 and free of holding or clamping contact with the line L. As soon as the line L stops going downward, the bead 6 floats up and as pull is imposed upon the line L by the fisherman, the bead 6 will roll up into the restricted portion of the chamber 3 and lock or clamp the float or bobber 1 to the line L by pressing the portion of the line L within the opening 2 against the tapered wall of the opening 2. After a strike, the struggling fish will sufficiently agitate the line L to release the bead 6 from clamping engagement with the line L and whereupon the float or bobber 1 will drop down or move to a position close to the sinker 7.

With the use of my improved float or bobber, it is preferred that when the cast is made the float or bobber be at a lowered position on the line L. When the float or bobber 1 is on the water any amount of line L can be let down.

In the embodiment of the invention as illustrated in Figures 4, 5 and 6, the fishing line F has attached thereto in the usual manner a lure 9 of any type preferred. The line F is disposed through a sinker S and, as herein disclosed, this sinker is of desired dimensions and weight and comprises a cylindrical hollow body 10 having a conoidal end portion 11, the apex of which is disposed inwardly or upwardly with respect to the line F.

The apex of the conoidal portion 11 is provided therethrough with a restricted opening 12 which can be the upper portion or substantially the axial center of the sinker S, as desired, while the opposite or larger end of the body 10 is closed by a plug 14. This plug 14, at its axial center, is provided with an opening 15 through which the line F is directed. As illustrated in the accompanying drawing, it is to be noted that the wall of the opening 15 through the plug 14 is outwardly flared. Freely arranged within the sinker S is a spherical bead 16 and which bead, when it extends within the conoidal portion 11 of the sinker, serves to clamp the sinker to the line F, as is clearly illustrated in Figure 5 of the drawing.

In practice, the sinker S is positioned upon the line F a considerable distance inwardly of or above the lure 9 and the weight of the sinker S or the natural tendency of the sinker S to move downwardly along the line F will lock the sinker in proper position upon the line. However, when the fish strikes, the resultant sudden jerk releases the bead 16 allowing the sinker S to slide down the line to a point immediately adjacent to the lure 9, as illustrated in Figure 6, thus facilitating the fisherman reeling in the line and landing the fish. It is believed to be apparent from the drawing that the harder the pull forward on the sinker, the tighter it locks, and it is also believed to be apparent that the sinker S can only become unlocked when pulled from the rear or below, as by the striking fish.

From the foregoing description it is thought to be obvious that a float or bobber constructed in accordance with my invention is particularly well adapted for use by reason of the convenience and facility with which it may be assembled and operated.

I claim:

1. An attachment for a fishing line comprising a member having an opening therethrough through which the line is to be freely passed, a portion of said opening within the member being enlarged to provide a chamber having a tapered wall with the larger end of the chamber outwardly disposed, and a buoyant bead within the chamber to provide means to lock the line between the bead and the tapered wall.

2. An attachment for a fishing line comprising a member having an opening therethrough through which the line is to be freely passed, a portion of said opening within the member being enlarged to provide a chamber having a tapered wall with the larger end of the chamber outwardly disposed, and a buoyant bead within the chamber to provide means to lock the line between the bead and the tapered wall, said bead being spherical.

3. An attachment for a fishing line comprising a member having an opening therethrough through which the line is to be freely passed, a portion of said opening within the member being enlarged to provide a chamber having a tapered wall with the larger end of the chamber outwardly disposed and a buoyant bead within the chamber to provide means to lock the line between the bead and the tapered wall, the chamber being at the lower end portion of the member and opening out through the lower end, and a plug for closing the outer end portion of the chamber, said plug having an opening therethrough for the passage of the line.

R. B. WORDEN.